April 29, 1958

I. H. DUNHAM 2,832,443

ARRESTING MEANS FOR PREVENTING
OVERRUN OF REVOLVING SHAFT

Filed Jan. 19, 1955

INVENTOR.
IRVIE H. DUNHAM
BY
PARKER & CARTER
ATTORNEYS

United States Patent Office 2,832,443
Patented Apr. 29, 1958

2,832,443
ARRESTING MEANS FOR PREVENTING OVER-RUN OF REVOLVING SHAFT

Irvie H. Dunham, Racine, Wis.

Application January 19, 1955, Serial No. 482,733

2 Claims. (Cl. 188—83)

My invention relates to improvements in an arresting means for preventing overrunning of a revolving shaft.

The principal object of my invention is to provide an especially simple and economical means for stopping the revolving of a driven shaft as soon as driving torque thereon is discontinued.

In carrying out my invention I provide a novel form of resilient means for applying frictional contact to the central area at one end of a driven shaft, to cause the shaft to stop instantaneously when the driving torque ceases.

Other objects of my invention will appear from time to time as the description proceeds. The invention may best be understood by reference to the accompanying drawing, in which.

Figures 3, 4:
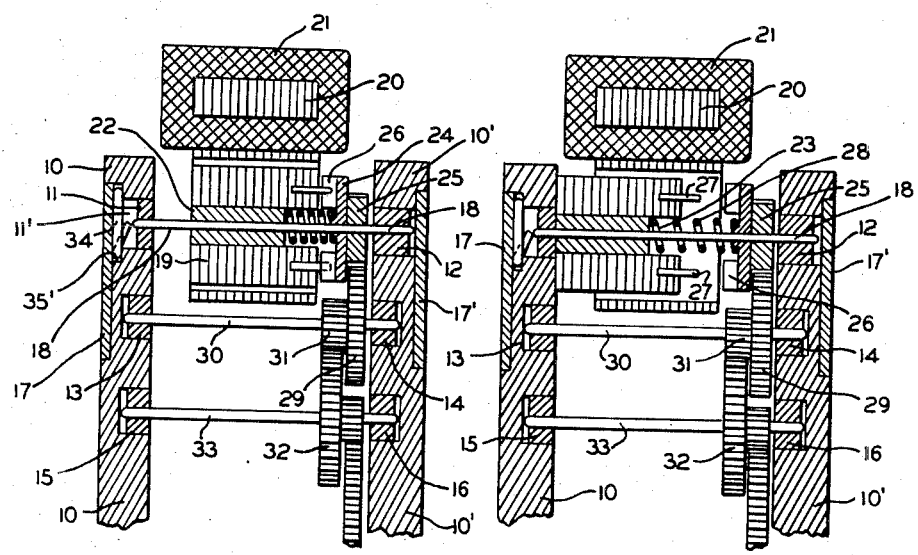
Figure 3 is a vertical cross section of a conventional electric motor, to which the device of my invention is applied.
Figure 4 is a similar cross sectional view of the motor shown in Figure 3 but with the rotor unclutched from the shaft and illustrating the function of my device, namely, to prevent overrunning of the driven shaft when it is otherwise free to rotate.

Referring now to details of the embodiment of the invention shown in the drawing, Figures 3 and 4 show a conventional fractional horsepower electric motor having a rotor slidably mounted on its drive shaft to provide part of a clutch for moving a gear train. 10 and 10' indicate vertical supports provided with opposed pairs of rotor shaft bearings 11, 12, and gear train bearings 13, 14, and 15 and 16. The supports 10 and 10' have suitable bored recesses 11' and 12', respectively, in which the bearings 11 and 12 are mounted, and have detachable plates 17 and 17', respectively, affording access to the recesses 11' and 12' at the outer ends of the rotor shaft bearings 11, 12.

A rotor shaft 18 is journalled in the bearings 11 and 12 with its ends projecting through the latter. Said shaft has a rotor 19 slidably mounted thereon and adapted to be driven by a magnetic field core 20 when a suitable voltage is imposed upon a coil 21 surrounding the core 20. The rotor 19 has a bearing sleeve 22 on the shaft 18. This bearing 22 is shown in somewhat shorter length than the rotor to provide a recess 23 at one end of the latter.

The shaft 18 has a clutch member 24 fixed near one end thereof, with a pinion 25 fixed to the outer face of said clutch member. The latter member has a plurality of inwardly projecting recesses 26, and the rotor 19 has opposed projecting pins 27 for driving engagement with the recesses 26.

A compression coil spring 28 surrounds the shaft 18 within the recess 23 of the rotor 19, and engages the rotor sleeve 22 at one end and the clutch member 24 at the other. With this conventional form of electric motor, energization of the field core 20 causes the rotor 19 to slide along the shaft 18 into clutching position as shown in Figure 3, wherein the pins 27 engage with the recesses 26 on the clutch member 24, thereby causing the shaft 18 to be rotated by and with the rotor 19. Inasmuch as the pinion 25 is also attached to the shaft 18, it will revolve with the shaft and form a drive means for a gear 29 mounted to a shaft 30 journalled in bearings 13 and 14. The latter shaft may also have a pinion 31 fixed thereon for driving a gear 32 on a third shaft 33 journalled in bearings 15 and 16. Such an old and well known motor and gear train structure is shown to illustrate the main purpose of my invention, which is to provide a simple, inexpensive and dependable means for preventing the overrunning of the drive shaft 18 and the gear train connected thereto when the magnetic field is de-energized and the motor is disconnected from driving engagement with said gear shaft and train.

Figure 5:
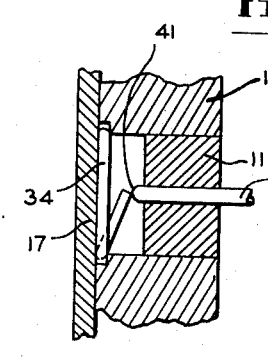
Figure 5 is an enlarged detail view in longitudinal cross section of the end bearing of the motor shown in Figures 3 and 4.

Referring now to the improved means for arresting rotation of the shaft 18, I insert a compression spring member 34 in the vertical support member 10, between the access plate 17 and the adjacent end of the shaft 18, as shown in Figures 3, 4 and 5.

Figure 1:
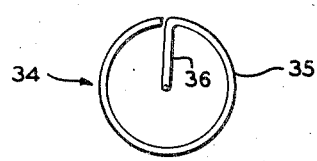
Figure 1 is a plan view of the preferred form of device constructed in accordance with my invention.
Figure 2:
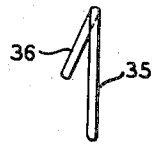
Figure 2 is a side view of the device shown in Figure 1.

The preferred structure of the spring member is shown in Figures 1 and 2 and consists of a single length of wire, formed with a circular coplanar base portion 35 and with one straight end portion 36 of said wire bent inwardly of and at an intermediate angle of divergence from said circular portion. Said straight end portion is disposed in a plane including, and terminates approximately at the axis of the circular end portion. Said spring member may be constructed of music wire or the like or any material of a similar resilient nature.

The circular portion 35 of the compression spring 34 is seated in an annular groove 35' at the outer end of the bored recess 11' in which the shaft bearing 11 is mounted.

The extreme end of the straight end portion 36 is adapted to engage the central area of the end of the shaft 18 under sufficient pressure to arrest the revolving motion of the shaft 18 almost instantaneously, when driving torque is discontinued by disengagement of motor clutch parts 26 and 27.

Figure 6:
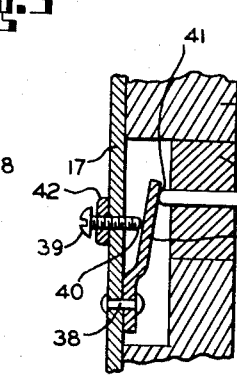
Figure 6 is an enlarged detail cross section view of the end bearing of the motor, with a modified form of my invention applied thereto.
Figure 7:
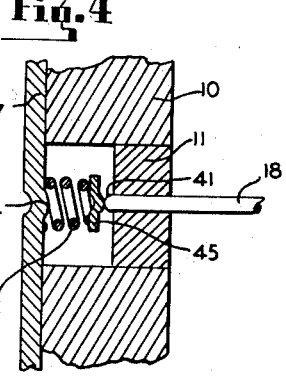
Figure 7 is a view similar to those of Figures 5 and 6, but showing another modified form of my invention applied thereto.

In Figures 6 and 7 a modified spring means is provided to engage the end of the shaft 18.

In Figure 6 a leaf spring 37 is attached to the access plate 17 at 38, and has a screw 39 threadedly engaging the plate 17 and contacting the leaf spring 37 at 40 to bring the leaf spring 37 into engagement with the end of the shaft 18 at 41. Obviously, the screw 39 is adjustable to vary the tension of the leaf spring 37, and the screw 39 is shown held in a fixed position after adjustment, by means of the lock nut 42.

In Figure 7, a compression type coil spring 43 is supported at one end by means of a projection 44 on the inner face of the access plate 17, and the other end of the spring 43 supports a plate 45 for frictional contact with the shaft 18 at 41.

Although I have shown and described certain embodiments of my invention, it will be understood that I do not wish to be limited to the exact construction shown and described but that various changes and modifications may be made without departing from the spirit and scope of the invention as defined by the appended claims.

I claim:

1. In combination with a driven shaft, supporting means for said shaft including a bearing support having a recess therein, an annular bearing for said shaft mounted in said recess, with one end of said shaft extending into said recess, and a spring member mounted in said recess having one portion thereof yieldably engaging the extreme outer end of said shaft, said spring member consisting of a length of wire having a base portion thereof wound in coplanar circular form, and with a substantially straight end portion of said wire bent inwardly from and at an intermediate angle to said base portion, said straight end portion being disposed in a plane including, and terminating substantially at the axis of said base portion, said base portion being adapted to fit within the recess in the bearing support with the end of the straight end portion disposed in yielding engagement with the extreme outer end of the shaft.

2. The structure of claim 1, wherein the recess in the bearing support has an annular groove at its outer end, the base portion of the spring member is seated within said groove, and a closure plate for said recess is detachably secured to said bearing support to hold the base of said spring member in seated position within the annular groove.

References Cited in the file of this patent

UNITED STATES PATENTS

| | | |
|---|---|---|
| 784,272 | Nagle | Mar. 7, 1905 |
| 1,619,574 | Horton | Mar. 1, 1927 |
| 2,279,434 | Balz | Apr. 14, 1942 |
| 2,429,696 | Merkt | Oct. 28, 1947 |
| 2,486,027 | Hirsch | Oct. 25, 1949 |